United States Patent [19]

Lin

[11] Patent Number: 5,558,527

[45] Date of Patent: Sep. 24, 1996

[54] TWO-STAGE EJECTING DEVICE FOR EXPANSION SLOTS

[76] Inventor: Carol S. M. Lin, No. 3, Houng-Shi Rd., Chung-Li City, Tao-Yuan Hsien, Taiwan

[21] Appl. No.: 354,149

[22] Filed: Dec. 6, 1994

[51] Int. Cl.⁶ .................................................. H01R 13/62
[52] U.S. Cl. .......................... 439/155; 439/159; 439/160
[58] Field of Search .................................... 439/153, 155, 439/157, 159, 160

[56] References Cited

U.S. PATENT DOCUMENTS

| 4,810,200 | 3/1989 | Sakamoto | 439/155 |
| 5,026,296 | 6/1991 | Hashiguchi | 439/159 |
| 5,139,435 | 8/1992 | Kamatsu et al. | 439/159 |
| 5,226,828 | 7/1993 | Fietz | 439/160 |

FOREIGN PATENT DOCUMENTS 6438983  2/1989  Japan ..................................... 439/153

Primary Examiner—P. Austin Bradley
Assistant Examiner—Jill Demello
Attorney, Agent, or Firm—Larson and Taylor

[57] ABSTRACT

The present invention is a two-stage ejecting device for the expansion slot of a computer; the device consists of a main setting, a push rod, and a drive link, wherein the rod contains a pivot arm whose position is in accordance with a guidance on the main setting; the coupling between the arm and the guidance leads to the formation of a two-stage ejecting device in that the push rod is fully contained in the computer case under normal condition and it can be activated to extend out of the case to the operator's convenience under the condition that the ejection of a cartridge is needed.

10 Claims, 9 Drawing Sheets

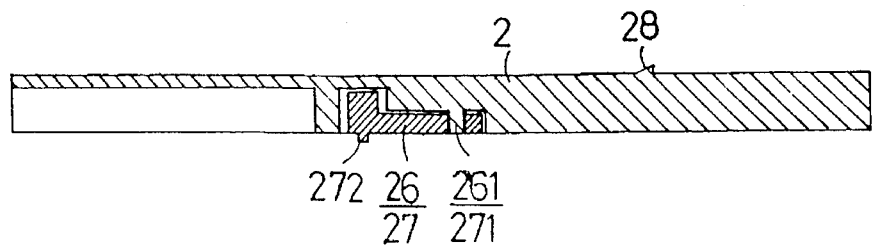
FIG.5
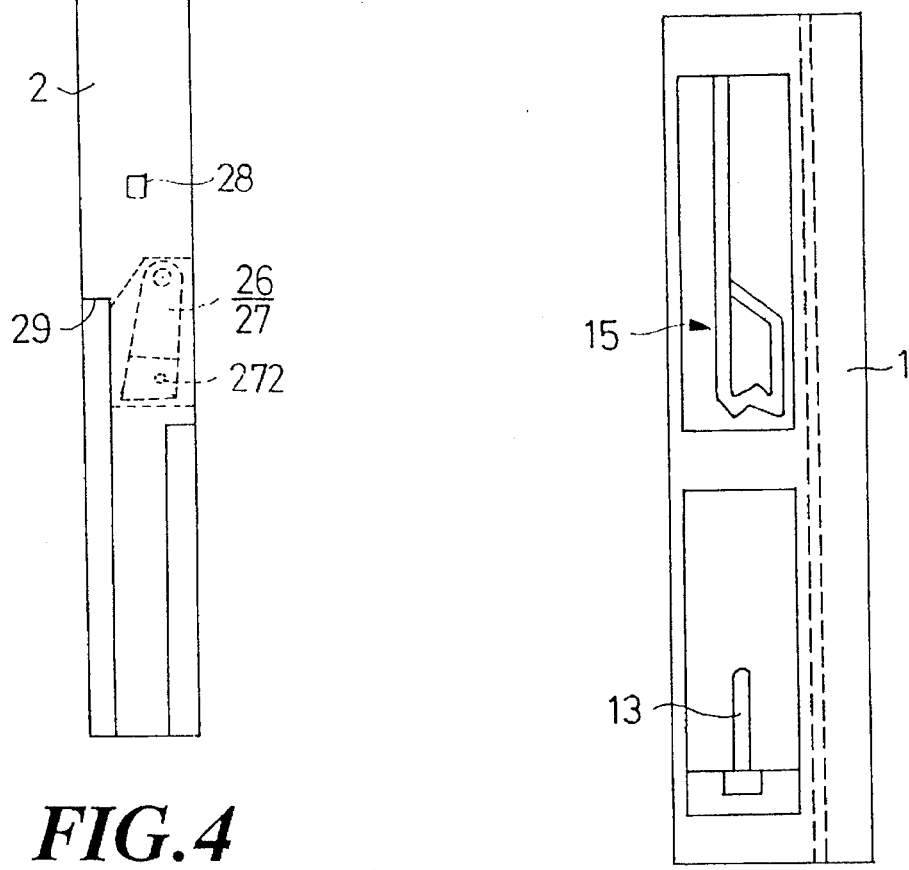
FIG.4
FIG.6
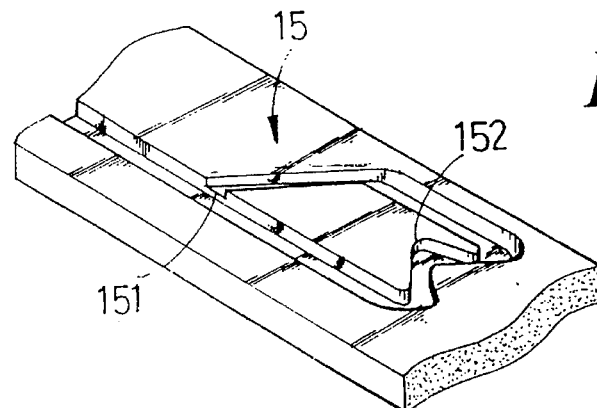
FIG.7

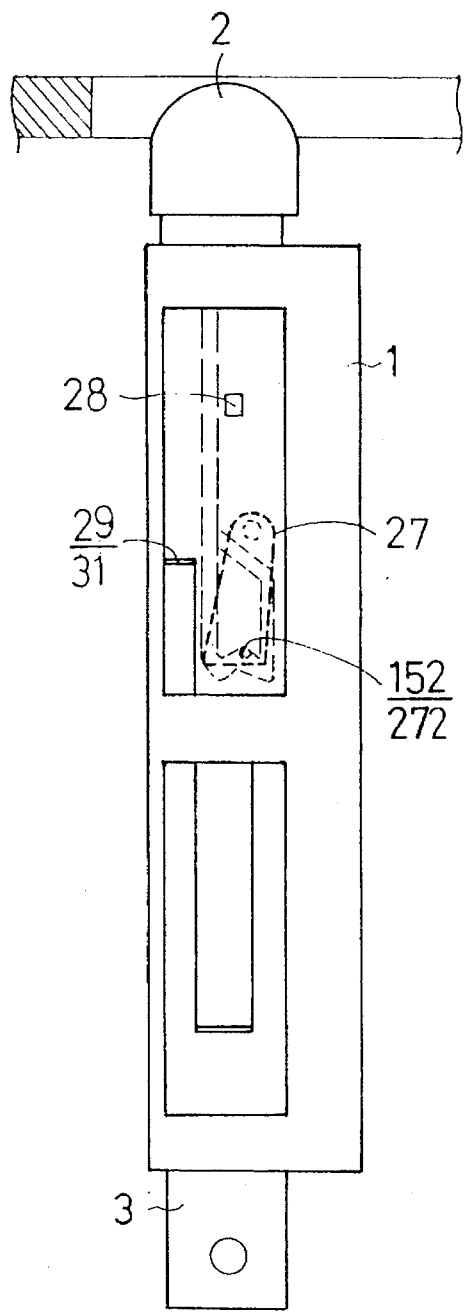
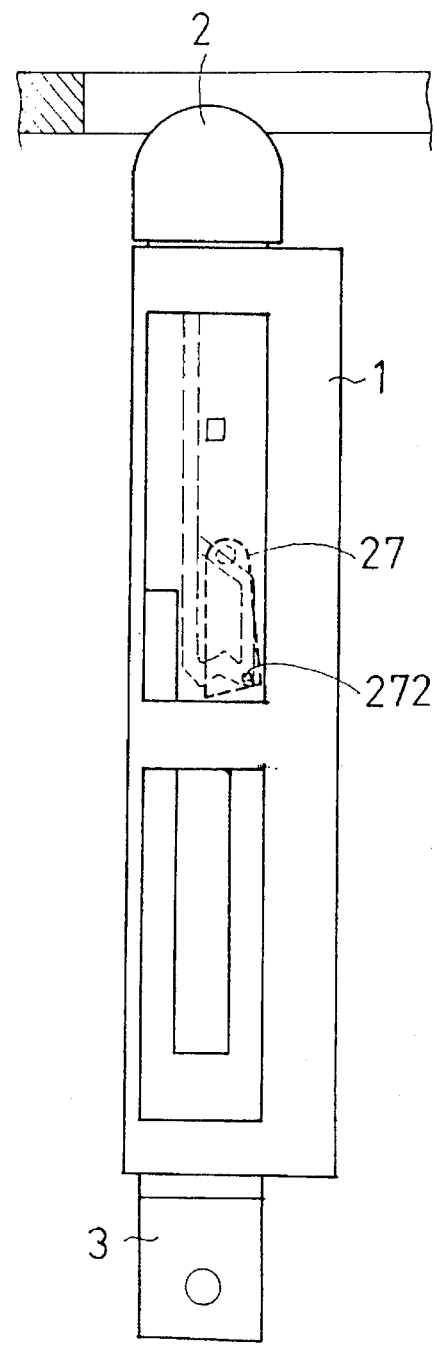
*FIG.8*  *FIG.9*

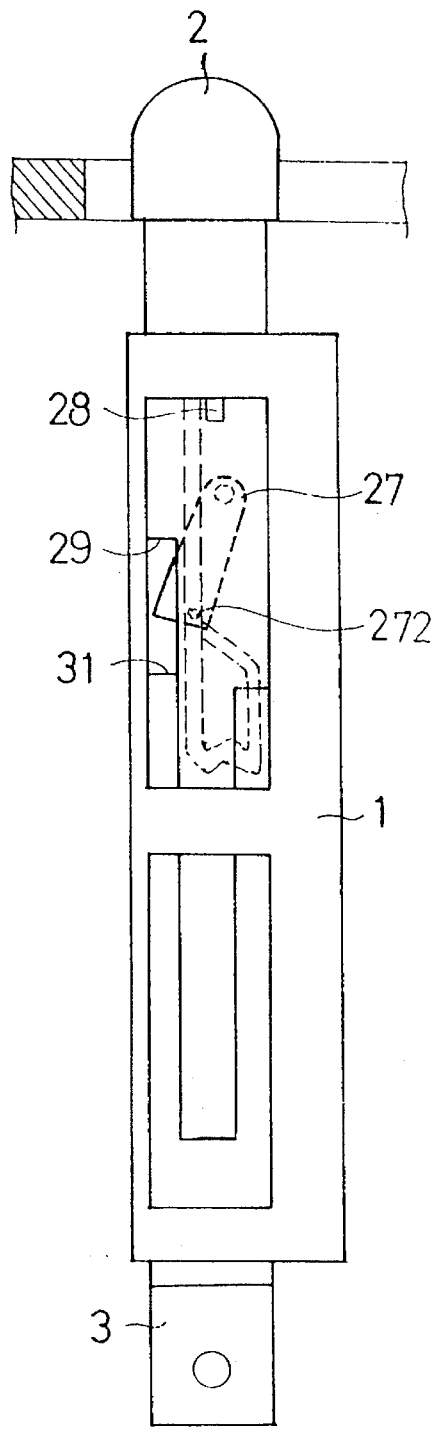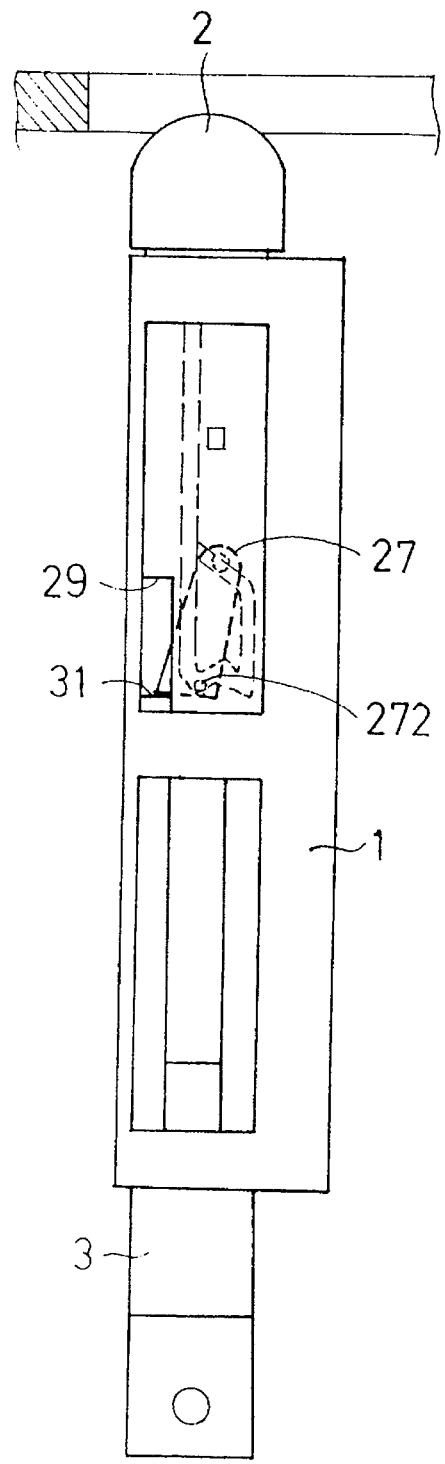
*FIG.10*  *FIG.11*

TWO-STAGE EJECTING DEVICE FOR EXPANSION SLOTS

The present invention is a device for ejecting a cartridge in the expansion slot of a computer; the push rod of the device is to form an ejection slate comprising two stages:

DESCRIPTION OF THE PRIOR ART

The ejecting devices in the prior art, such as disclosed in the U.S. patent application Ser. No. 08/172,070, possess a displacement control and a swing control located on a push rod, accompanied by corresponding displacement guidance and swing guidance on the main setting, by which the top of the push rod can be held below the level of the the opening of a computer case; when an ejection of a cartridge is needed, the push rod can be activated to extend out of the case to a proper height above the opening so that the operator may push the rod to eject the cartridge.

Observing the configuration of the above patent, we found that the movement of the pivot arm is controlled by two separate systems, the displacement control and the swing control on a push rod connected with the displacement guidance and the swing guidance on the main device respectively to complete a stage of extension or a stage of contraction, as seen from the push rod The configuration and the associated components of the above patent are so complex that neither the reliability of its operation nor its production cost is satisfactory.

SUMMARY OF THE INVENTION

The main feature of the present invention is the push rod possessing a pivot arm which is connected to the guidance of tile main setting; this combination forms a single control system which achieves the same function of tile extension and the contraction described hereinbefore.

Therefore a two-stage ejecting device of which configuration is simple, reliability high, and production cost low is formed.

BRIEF DESCRIPTION OF THE FIGURES

FIG. 4 is the top view of the push rod of the ejecting device.

FIG. 5 is the sectional view of the push rod shown in FIG. 4.

FIG. 6 is the top view of the main setting of the ejecting device.

FIG. 7 is an enlarged view of the guidance shown in FIG. 6.

FIG. 8 shows the end position of the push rod of the ejecting device.

FIG. 9 shows the push rod being pushed downward in the first stage.

FIG. 10 shows the start position of the push rod after being ejected up

FIG. 11 shows the push rod being pushed downward again, driving the drive link.

DETAILED DESCRIPTION OF THE PREFERRED EMBODIMENT

Figure 1:
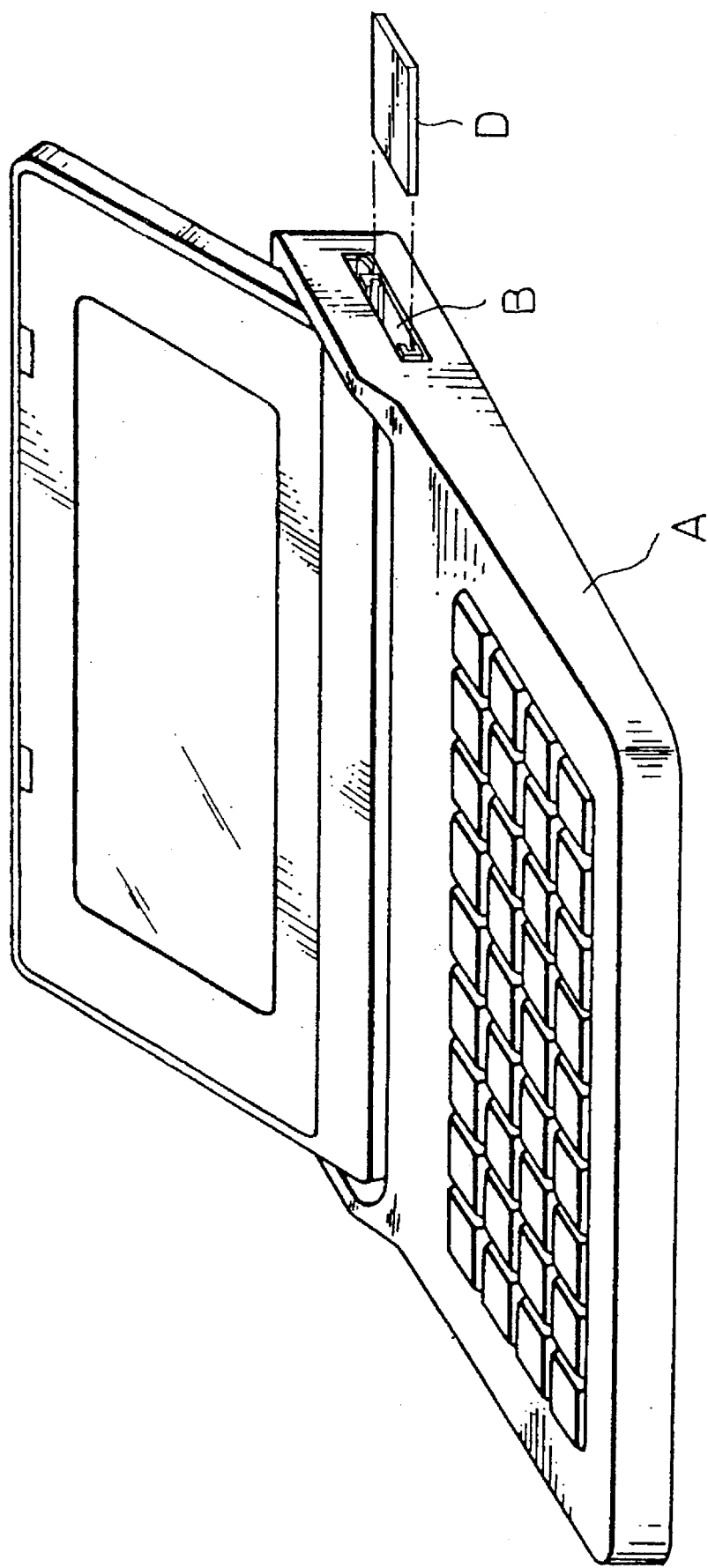
FIG. 1 shows a computer equipped with an expansion slot.
Figure 2:
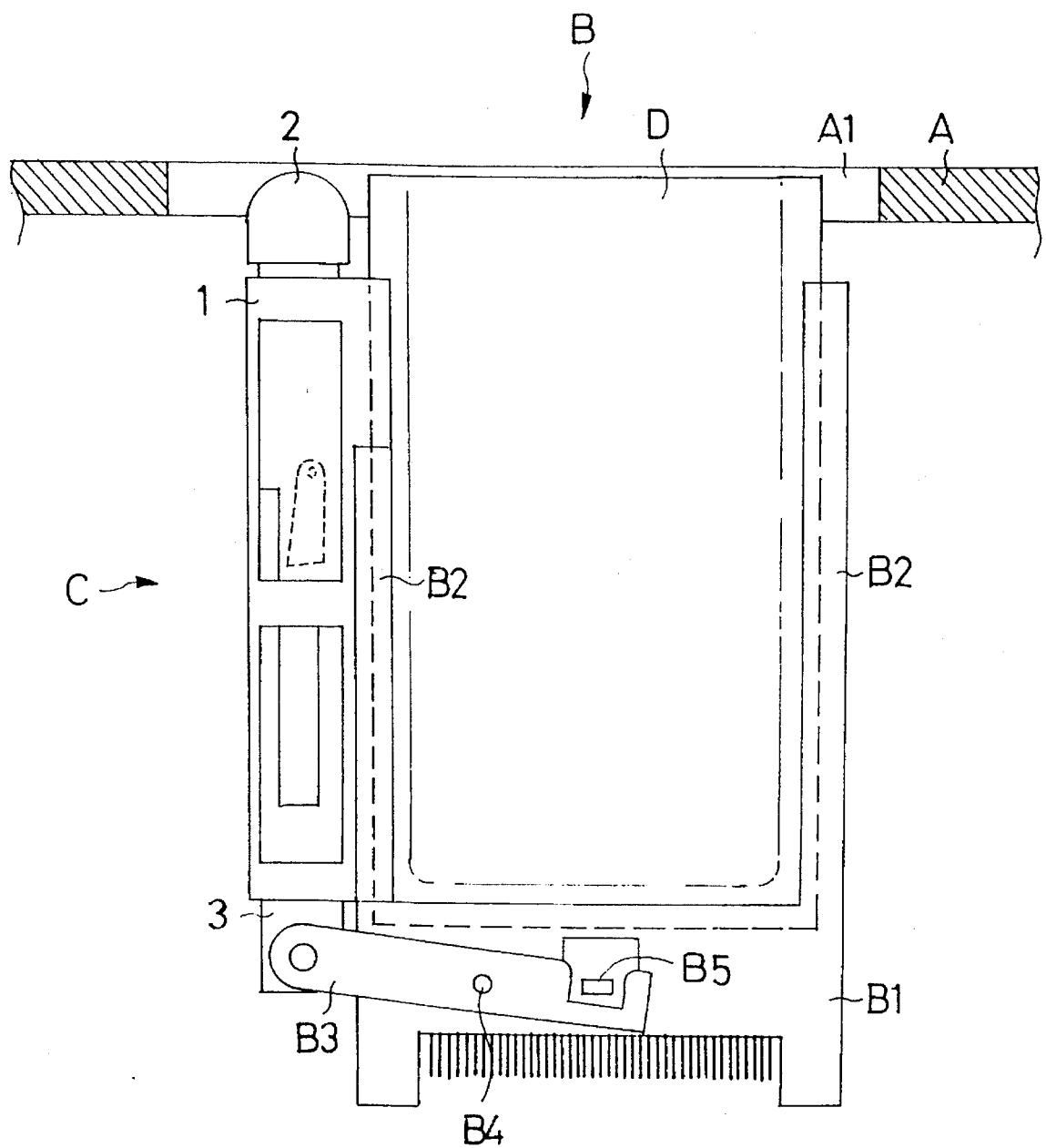
FIG. 2 shows the arrangement of an expansion slot, an ejecting device, and a computer case.

As shown in FIGS. 1 and 2, one side of a computer case (A) has an expansion slot (B) for the insertion of a cartridge (D); the slot (B), extending from two ends of the cartridge setting (B1) to the opening (A1) on the case, consists of grooves (B2) for a cartridge (D) to slide and an ejecting device (C) located dose to and in parallel with one of the sliding grooves (B2).

Moreover, as one arm of a lever (B3) which is connected to the drive link (3) of the ejecting device (C) is driven and moves downward, the lever (B3) rotates about a pivot axis (B4), pushing a slug (B5) which is under the cartridge setting (D) upward, and consequently the cartridge (D) gets pushed up, leaving the confinement by its setting (B1).

The ejecting device (C) described above, now shown in FIG. 3, consists of a main setting (1), a push rod (2), and a drive link (3), wherein the push rod (2) is contained in the main setting (1) in a movable state and close to its middle the rod is carved to form a cut-off section (26) for containing a pivot arm (27) of which the base end is connected to a pivot bolt (261) on the rod through a hole so that the other end can swing; on the lower surface of the free end a guide boll (272) is formed.

Considering the push rod (2) just described which is shown in FIGS. 4 and 5 now, we found that when the lower surface of the pivot arm (27)is on the same level with the lower surface of the push rod (2), the guide bolt extends downward above the surface.

Moreover, the connection of the pivot arm (27) with the pivot bolt (272) in the cut-off section is a loose joint that allows the free end of the arm (27) to swing slightly in the longitudinal direction.

Figure 3:
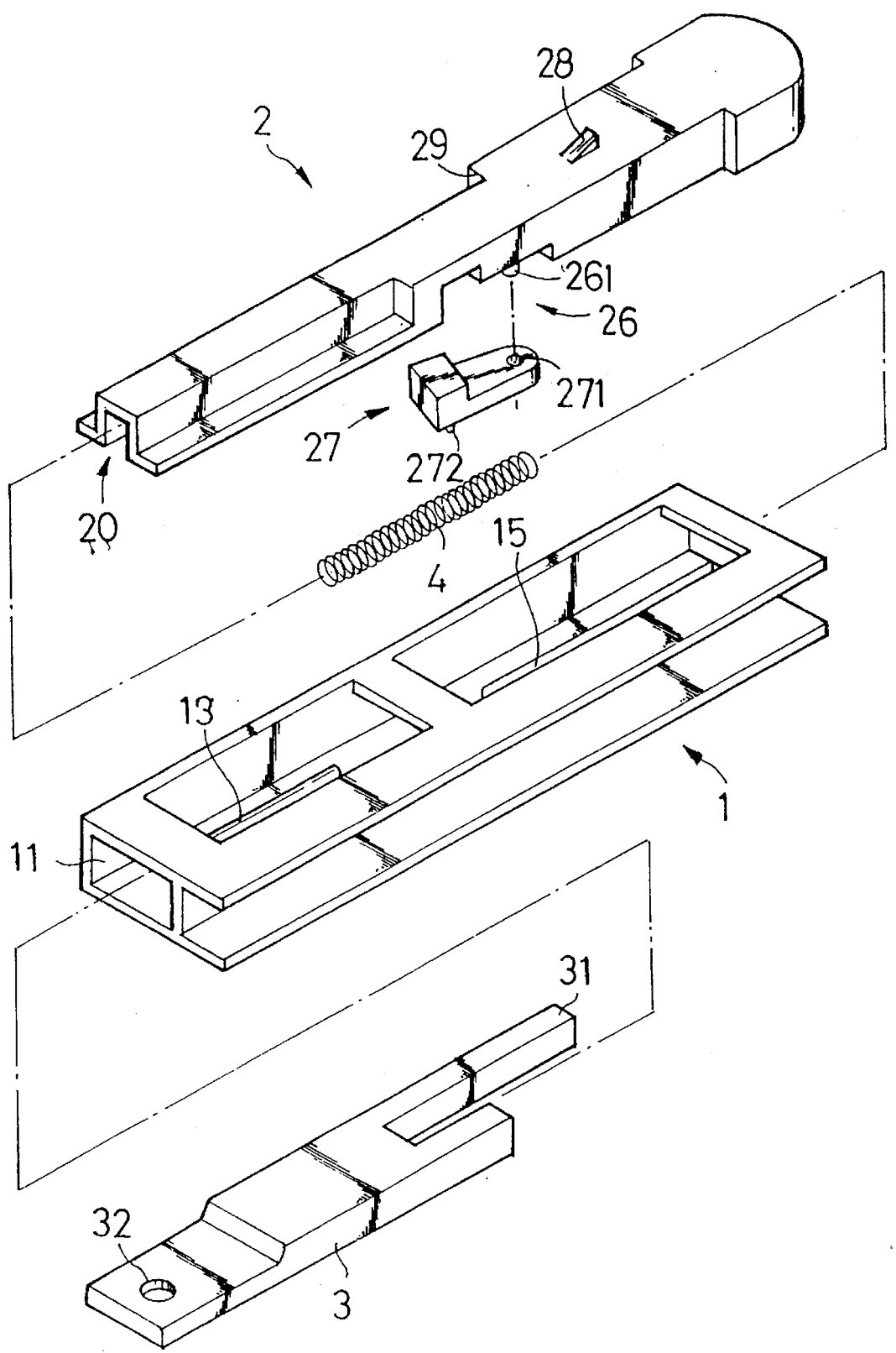
FIG. 3 shows the composition of the ejecting device in three dimensions.

The configuration of the main setting (1), shown in FIGS. 3 and 6 now, allows the push rod (2) to slide in the slide channel (11) in which a rod (13) is set for the placement of a spring (4)

As shown in FIG. 7, there is a ring guidance (15) on the contact surface of the slide channel (11) in the main setting with the push rod, of which the width and the depth are equal to the diameter and the height of the guide bolt (272) respectively The middle part of the bottom side of the ring guidance (15) is for guiding the guide bolt (272) to the right and is twisted inward to form a holding (152), while the top side of the ring (15) is for the guide bolt (272) to move the left.

The drive link (3) described hereinbefore is also contained and allowed to slide in the slide channel of the main setting (1); the upper part of the link forms an extended arm (31) for approaching or touching the push rod at its contact facet (29), and the lower part has a pivot hole (32) for the connection with the lever (B3) of the cartridge setting in the expansion slot Under the normal condition, as shown in FIG. 2 and FIG. 8, the spring force acted by a spring (4) in the containing slot (20) of the push rod (2) is exerted on the push rod (2), and at the same time the guide bolt (272) of the pivot arm (27)is confined in the holding (152) in the bottom side of the ring guidance (15), and hence the push rod is fixed in a preset position by the seize of the arm (27); the pivot arm under this condition is right in the middle of the cut-off section (26).

The state of the ejecting device just described is when a cartridge (D) is inserted into the expansion slot (B). To take the cartridge (D) out of the expansion slot (B), the operator pushes the top of the push rod (2), making the rod (2) to slide downward (as shown in FIG. 9), and consequently the guide bolt (272) of the pivot arm, guided by the right half of the bottom side of the ring guide (15), swings to the right, resulting in the breakaway of the guide bolt (272) from the holding (152) of the ring guidance. When the operator stops applying force, the push rod (2) is ejected upward by the force of the spring (4), and the guide bolt (272), led by the skew top side of the ring guidance (15), moves to the left; this motion makes the lower left part of the pivot arm (27) to intrude into the space between the extending arm (31) of the drive link and the contact facet (29) of the push rod (2) till a slop (28) in the upper part of the push rod (2) touches the upper setting of the main setting (1); this state represents the starting position of the push rod, as shown in FIG. 10.

Figure 12:
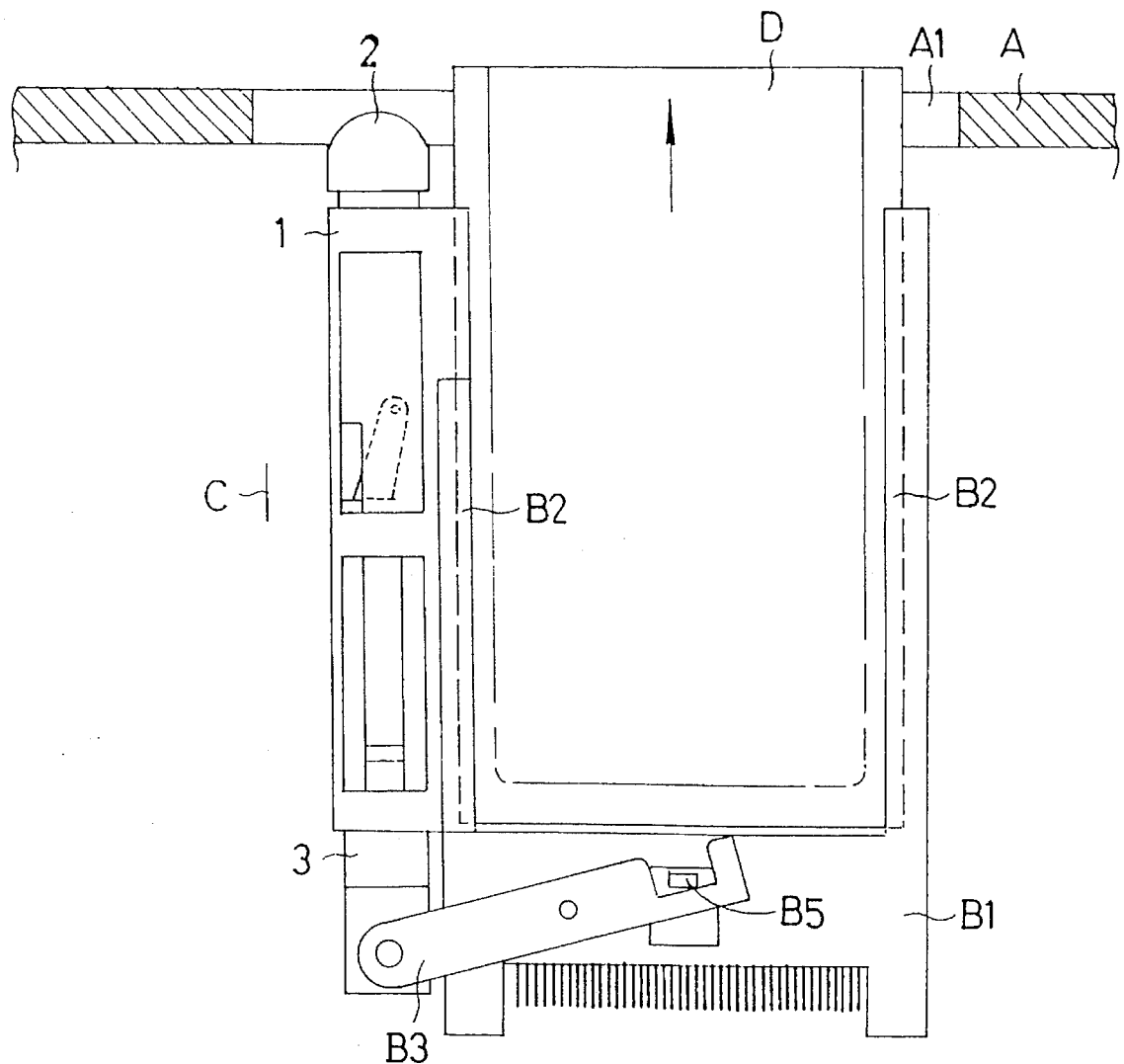
FIG. 12 shows a cartridge being ejected from an expansion slot.

Then the operator pushes the push rod (2) downward again, which makes the lower end of the pivot arm (27) now against one side of the push rod (2), to contact the extending arm (31) of the drive link (3) and to force it to move downward synchronically to the position shown in FIGS. 11 and 12.

Due to the down shift of the drive link (3), the lever (133) in the cartridge setting (B1) rotates about a pivot axis (B4) and pushes a slug (B5), by which the cartridge (D) is ejected from its setting (B1).

During the downward movement of the push rod (2), the guide bolt (272) slides along the left side of the ring guidance (15) to the bottom side and then is led by the turn at the lower left corner to move slightly to the right.

To prevent the guide bolt (272) from sliding into the top side of the ring guidance (15) during its way down, and thus resulting in the rightward movement of the pivot arm (27), a wedge (151) that makes certain the guide bolt (272) of the pivot arm (27) moving in accordance with the preset direction is formed at the entrance to the left side in the top side of the ring guidance (15), as can be seen in FIG. 7.

Because of the formation of a wedge (151) at the entrance to the left side in the top side of the ring guidance (15), the bottom of the slot in the top side becomes sloppy, and to avoid the interference on the guide bolt (272) by the bottom when passing over the slope, the thickness of the pivot arm (27) is made smaller than the depth of the cut-off section (26) and the connection between the hole (271) through the pivot arm (27) and the pivot bolt (261) on the upper wall of the cut-off section (26) is made to be a loose joint so that the free end of the pivot arm (27) is allowed to move slightly up and down, by which the interference between the guide bolt (272) and the bottom of the slot in the presence of the wedge (151) vanishes.

When the operator slops applying force, the push rod (2) is pushed up by the spring (4) again, and the bolt (272) is led into the holding (152), which completes a cycle of the its motion in the ring guidance (15); this condition as shown in FIG. 8, is when the push rod (2) is positioned at the end position. During this process the pivot arm (27) is driven by the dive link (3) to shrink to the right and to be in a position that it will not influence the vertical movement of the drive link (3), if a cartridge (D) is inserted again.

From the above description we know that this invention makes use of the coupling between a guide bolt (272) attached to a pivot arm (27) connected to a push rod and the guidance (15) on a main setting (1) to form a two-stage operation of a cartridge ejection by which the purpose that the push rod (2) of an ejecting device (C) will not extend out of a computer case under normal condition is fulfilled; this function can avoid the damage on the push rod by a foreign object.

However, in the case that the above ejecting device (C) is arranged vertically, the self gravity of the pivot arm (27) tends to pull itself in the direction of the gravity, which may cause a unwanted deflection thereof in its way down through the guidance (15); this deflection will prohibit the guide bolt (27) from moving into the preset position. To solve this problem and to maintain the operational reliability, we propose a design which is explained by the following preferred embodiment.

Figure 13:
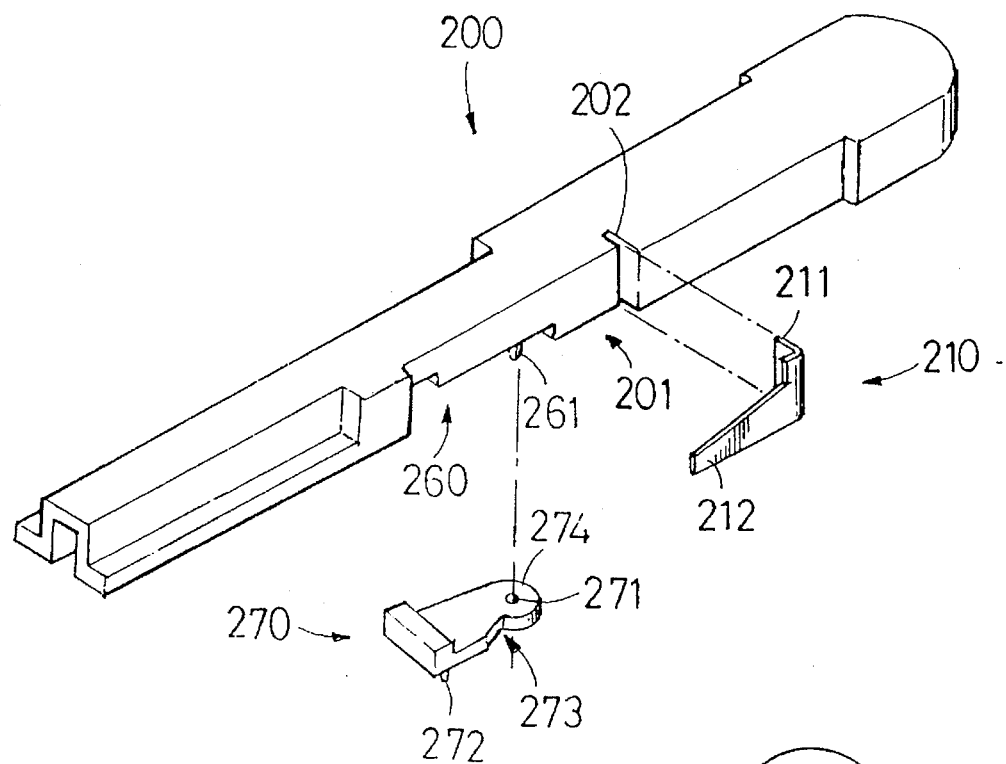
FIG. 13 shows the composition of the push rod in an embodiment demonstrating its variation.
Figure 14:
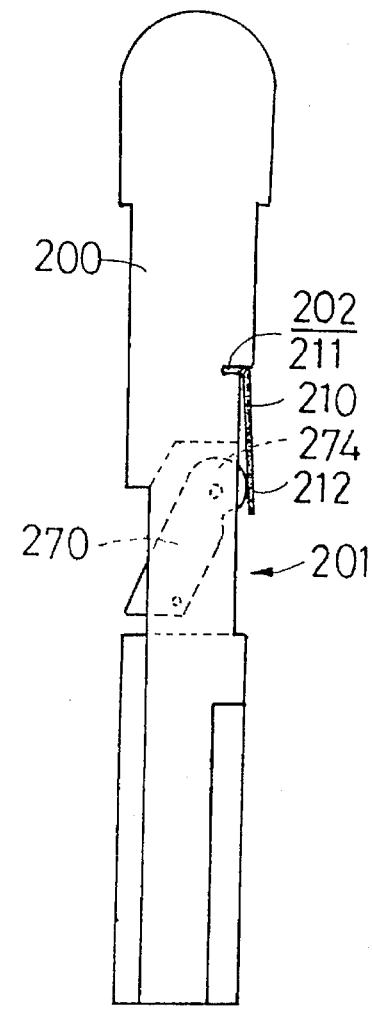
FIG. 14 is the top view of the push rod in FIG. 13.
Figure 17:
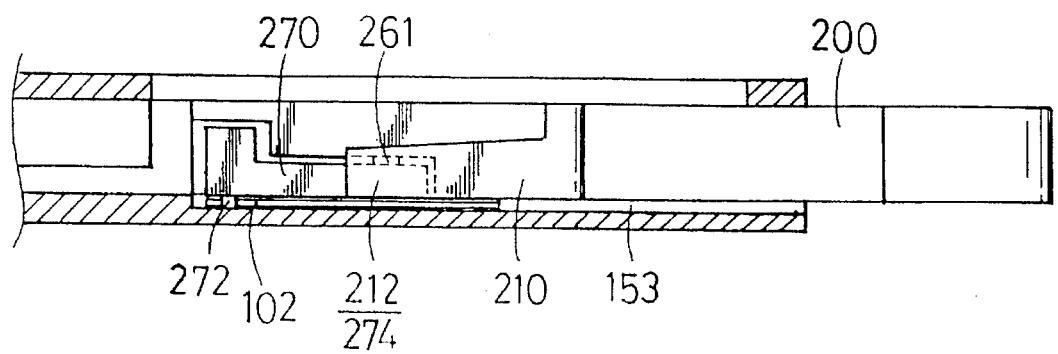
FIG. 17 is the sectional view of the part of the main setting containing the spring plate of the push rod and the guide rod along the guidance of the main body

As shown in FIGS. 13, 14, and 17, the push rod (200) of this invention contains a pivot arm (270) which is attached to the cut-off section (260) on the lower surface of the push rod by a pivot bolt (261); the base (274) end of the arm (270) pivoting on the bolt (261) through a hole (271) takes the form of a circular are centered at the hole; on one end of the circle a dent (273) is carved.

Moreover, a recess surface (210) is formed on one side wall of the push rod (200) in the section corresponding to the range of the cut off section (260), which results in a part of the circular are extending above the recess surface (201).

Moreover, a spring plate (210) made of a thin metallic plate is jointed with the push rod by inserting its base (211) into a rabbet (202) at the top of the recess surface (201); in this way the plate (210) is fixed and in full contact with the recess surface (201). One end of the spring plate (210) extends to touch the base end (274) of the pivot arm and is pushed up by the bulged base so that the spring force of the plate (210) provides the base (274) end with a frictional force through their contact, which will constrain the free swing of the arm (270) caused by its self gravity; therefore the reliability of the ejecting device (C) is enhanced.

To increase the frictional force between the spring plate (21) and the base (274) end of the pivot arm so that the unwanted slide between them during a vibration can be avoided, the contact surface of the circular arc of the base end (274) of the pivot arm with the spring plate (21) is properly roughened.

Considering the spatial relation between the spring plate (210) and the pivot arm (270), we found that when the arm (270) is pulled up by a up-going push rod (200). the arm's (270) swinging to the right may exceed the vertical line that one side of the arm (270) touches the spring plate (210), which results in a unwanted spring force that may push the arm (270) to a wrong position; this will cause a malfunction of the ejecting device. To solve this problem in a way that fits the practical design of a commercial product, a dent (273) is formed on one side of the base end of the pivot arm (274) in order that the side face of the arm (274) will not touch the spring plate (210) when the right swing of the pivot arm exceeding the vertical line.

Figure 15:
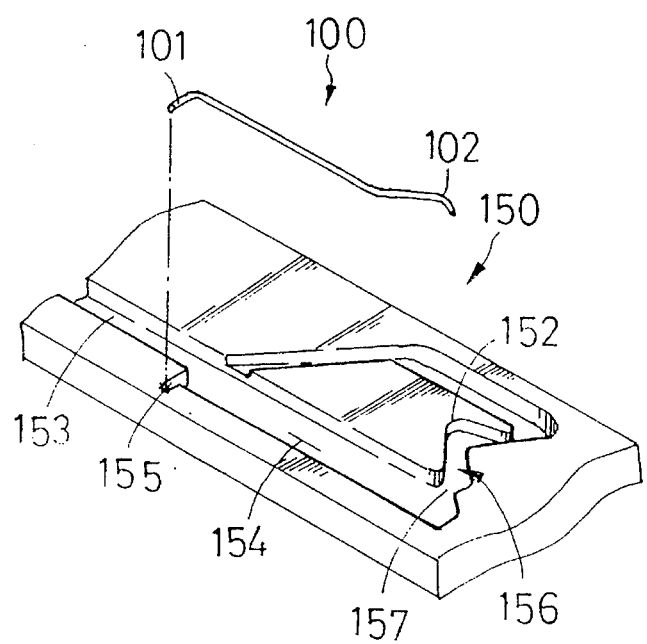
FIG. 15 shows the installation of a guide rod in the ring guidance on the main setting in another embodiment demonstrating the variation of the push rod.
Figure 16:
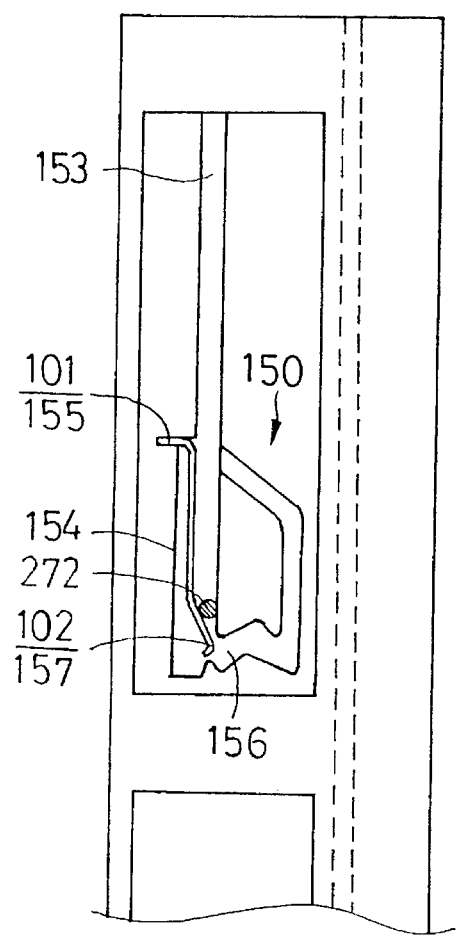
FIG. 16 is the top view of the main setting, which is for showing the spatial relation between the guide rod and the ring guidance

Besides the measure of installing a spring plate (210), embodiments of other structures that also prevent the unwanted deflection of the pivot arm (270), as shown in FIGS. 15, 16, and 17 as a guide rod (100), are discussed. The guide rod (100) can be made of a thin steel wire or a steel plate whose diameter or width shall not be larger than the depth of the ring guidance (150). In details, the path on the left side of the ring guidance (150) is widened to the left to allow the installation of the above guide rod; the enlarged section (154) is regarded as a part of the longitudinal guidance (153) along the main setting. The guide rod (100) extends from its fixed end (101) which is inserted in a rabbet (155) at the upper end of the enlarged section, along the side wall of the section; the other end (102) of the guide rod (100) is free, which is tilted toward the left side of the ring guidance (150) so that if approaches the entrance (157) to the transverse guidance (156). 53. Because the free end (102) of the guide rod approaches or touches slightly the entrance (157) to the transverse guidance (156), the guide bolt (272) of the pivot arm (270) which is driven down by the push rod (200) will contact with the free end (102), deflecting and passing it to enter the transverse guidance (156); the free end (102) of the guide rod, forced by the restoring force in itself, will reapproach the transverse guidance (156) and block the entrance (157), so the pivot arm (270) will not move backward to the longitudinal guidance (153) due to its self gravity, and the guide bolt (272) may move to the right smoothly.

This invention proposes that a spring plate (210) attached to the push rod (200) or a guide rod (100) in the guidance (150) of the main setting can be applied to prevent the pivot arm (270) from unwanted deflection due to its self gravity; these two measures can be used at the same time in a ejecting device to guarantee the reliability of its operation.

I claim:

1. A two-stage ejecting device for the expansion slot of a computer, comprising a main setting, a push rod having a lower surface, and a drive link; said device further comprising:

a cut-off section disposed approximately in the middle of the bottom side of said push rod;

a pivot bolt formed at one end of said cut-off section; and a pivot arm, having a lower surface and including a base end and a free end, connected to said cut-off section at said pivot bolt through a hole at the base end of said pivot arm, allowing the to free end of said pivot arm to undergo a swing movement; and a guide bolt formed on the lower surface of said pivot arm at said free end; the swing movement of the free end of said pivot arm including a slight movement in a longitudinal direction; and with the lower surface of said pivot arm and the lower surface of said push rod in alignment in a plane, said guide bolt extends outwardly from said plane; and a ring guidance formed on a contact surface between a slide channel of said main setting and the lower surface of said pivot arm and defining a path; and a holding formed in the middle of a bottom side of said ring guidance by an inwardly tilting of the path of said guidance, said guide bolt passing said holding to one side when being driven; and a top side of the path defined by said ring guidance providing movement of said guide bolt to a side opposite to said one side.

2. The arrangement of claim 1, wherein said cut-off section has a depth and wherein;

the coupling between the hole of said pivot arm and the pivot bolt of said cut-off section is a loose joint, because said pivot arm has a thickness smaller than the depth of said cut-off section.

3. The arrangement of claim 1, wherein contact between a stop of said push rod and an upper end of said main setting when said push rod is ejected upward defines a starting position of said push rod.

4. The arrangement of claim 1, wherein:

a positioning of said guide in the holding on the bottom side of said ring guidance defines an end position of said push rod.

5. The arrangement of claim 1, wherein:

a wedge is formed on the top side of said ring guidance at an entrance to said opposite side thereof.

6. The arrangement of claim 1, wherein:

the base end of said pivot arm connected through a hole to the pivot bolt of said cut-off section of said push rod comprises a circular arc centered at the hole; and said arrangement further comprises:

a recess surface formed on one side of said push rod, substantially over the range of said cut-off section and having an upper end, a rabbet being formed at the upper end of said recess surface;

a part of said circular arc of the base end of said pivot arm which extends above said recess surface; and a spring plate having a spring bottom inserted into said rabbet of said push rod and a spring top elastically touching said part of said circular arc of the base end of said pivot arm over said recess surface.

7. The arrangement of claim 6, wherein:

a dent is formed on one side of said pivot arm along an extended tangent from one end point of said circular arc.

8. The arrangement of claim 6, wherein:

the base end of said pivot arm contacts said spring plate with a roughened contact surface.

9. The arrangement of claim 1, wherein:

a section of a longitudinal slot in said main setting forms one side of said ring guidance and is widened outwardly to form an enlarged section and wherein a rabbet is formed at the upper end of said enlarged section; said arrangement further including a guide rod having a base fixed at said rabbet; said guide rod extending along and in parallel with a side wall of said longitudinal slot, and said guide rod having a free end tilted to approach or to slightly contact an entrance portion of a transverse slot of said ring guidance.

10. The arrangement of claim 9, wherein said ring guidance has a depth and wherein;

said guide rod has a width which does not exceed the depth of said ring guidance.

* * * * *